(12) United States Patent
Pang et al.

(10) Patent No.: US 11,809,996 B2
(45) Date of Patent: Nov. 7, 2023

(54) ADJUSTING PARAMETERS IN AN ADAPTIVE SYSTEM

(71) Applicant: University of Central Florida Research Foundation, Inc., Orlando, FL (US)

(72) Inventors: Shuo Pang, Orlando, FL (US); Guifang Li, Orlando, FL (US); Zheyuan Zhu, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 282 days.

(21) Appl. No.: 17/026,388

(22) Filed: Sep. 21, 2020

(65) Prior Publication Data

US 2022/0092426 A1 Mar. 24, 2022

(51) Int. Cl.
*G06N 3/08* (2023.01)
*G06N 3/084* (2023.01)
*G06N 7/01* (2023.01)

(52) U.S. Cl.
CPC ........... *G06N 3/084* (2013.01); *G06N 7/01* (2023.01)

(58) Field of Classification Search
CPC ......... G10L 25/30; H04B 3/237; G06T 5/007; H04R 25/00; H03L 1/026
See application file for complete search history.

(56) References Cited

U.S. PATENT DOCUMENTS

| | | | |
|---|---|---|---|
| 2003/0174400 A1* | 9/2003 | Patel | G02F 1/0136 359/489.15 |
| 2007/0188623 A1* | 8/2007 | Yamashita | G06T 5/007 348/222.1 |
| 2010/0226503 A1* | 9/2010 | Tanaka | H04B 3/237 381/66 |
| 2013/0188759 A1* | 7/2013 | Jain | H03H 21/0012 375/343 |

(Continued)

OTHER PUBLICATIONS

S. Sastry, M. Bodson, and J. F. Bartram, "Adaptive Control: Stability, Convergence, and Robustness," J. Acoust. Soc. Am. 88, 588-589 1990.

(Continued)

*Primary Examiner* — Saba Dagnew
(74) *Attorney, Agent, or Firm* — Fleit Intellectual Property Law; Jon Gibbons

(57) ABSTRACT

An adaptive system and a method for adjusting a parameter in the adaptive system includes operating an adaptive system with an output signal produced from an input signal applied to an input, in which a parameter with a finite range is determined based on a difference between the output signal and a target output signal. In one example the parameter with the finite range is a fixed-point parameter or an analog parameter. The parameter is accessed from the adaptive system. A probability distribution of the parameter is assigned. The finite range for the parameter is updated based on the probability distribution which has been assigned. The probability distribution function may be updated alone with the finite range of the parameter. The probability distribution may be derived from one or more historical values of the parameter, and a plurality of system parameters belonging to an identical category of data as the parameter.

23 Claims, 8 Drawing Sheets

(56) References Cited

U.S. PATENT DOCUMENTS

| | | | | |
|---|---|---|---|---|
| 2014/0337261 | A1* | 11/2014 | Esterline | H03L 1/026 706/25 |
| 2018/0007477 | A1* | 1/2018 | De Vries | H04R 25/00 |
| 2020/0081683 | A1* | 3/2020 | Cremer | G10L 25/30 |

OTHER PUBLICATIONS

S. O. Haykin, Adaptive Filter Theory, 5th ed. (Pearson Education) 2013.

T. F. de Lima, H.-T. Peng, A. N. Tait, M. A. Nahmias, H. B. Miller, B. J. Shastri, and P. R. Prucnal, "Machine Learning With Neuromorphic Photonics," J. Light. Technol. 37, 1515-1534 2019.

A. Krizhevsky, I. Sutskever, and G. E. Hinton, "ImageNet classification with deep convolutional neural networks," in Advances in Neural Information Processing Systems 2012.

A. Esteva, B. Kuprel, R. A. Novoa, J. Ko, S. M. Swetter, H. M. Blau, and S. Thrun, "Dermatologist-level classification of skin cancer with deep neural networks," Nature 542, 115-118 2017.

R. Collobert and J. Weston, "A Unified Architecture for Natural Language Processing: Deep Neural Networks with Multitask Learning," in Proceedings of the 25th International Conference on Machine Learning, ICML '08 (Association for Computing Machinery), pp. 160-167 2008.

D. Silver, T. Hubert, J. Schrittwieser, I. Antonoglou, T. Graepel, T. Lillicrap, K. Simonyan, D. Hassabis, A. Turing, and C. Shannon, "A general reinforcement learning algorithm that masters chess, shogi, and Go through self-play," Science (80-. ). 1144, 1140-1144 2018.

V. Sze, Y. Chen, T. Yang, and J. S. Emer, "Efficient Processing of Deep Neural Networks: A Tutorial and Survey," Proc. IEEE 105, 2295-2329 2017.

M. Horowitz, "Computing's energy problem (and what we can do about it)," in 2014 IEEE International Solid-State Circuits Conference Digest of Technical Papers (ISSCC) (IEEE, 2014), pp. 10-14 2014.

S. Gupta, A. Agrawal, K. Gopalakrishnan, and P. Narayanan, "Deep Learning with Limited Numerical Precision," 32nd Int. Conf. Mach. Learn. ICML 2015 3, 1737-1746 2015.

W. Haensch, T. Gokmen, and R. Puri, "The Next Generation of Deep Learning Hardware: Analog Computing," Proc. IEEE 107, 108-122 2019.

P. Yao, H. Wu, B. Gao, J. Tang, Q. Zhang, W. Zhang, J. J. Yang, and H. Qian, "Fully hardware-implemented memristor convolutional neural network," Nature 577, 641-646 2020.

R. Hamerly, L. Bernstein, A. Sludds, M. Soljačić, and D. Englund, "Large-Scale Optical Neural Networks Based on Photoelectric Multiplication," Phys. Rev. X 9, 1-12 2019.

M. Cheng, L. Xia, Z. Zhu, Y. Cai, Y. Xie, Y. Wang, and H. Yang, "TIME: A training-in-memory architecture for RRAM-based deep neural networks," IEEE Trans. Comput. Des. Integr. Circuits Syst. 38, 834-847 2019.

J. Choi, Z. Wang, S. Venkataramani, P. I.-J. Chuang, V. Srinivasan, and K. Gopalakrishnan, "PACT: Parameterized Clipping Activation for Quantized Neural Networks," arXiv Prepr. arXiv1805.06085 1-15 2018.

S. Jung, C. Son, S. Lee, J. Son, J.-J. Han, Y. Kwak, S. J. Hwang, and C. Choi, "Learning to Quantize Deep Networks by Optimizing Quantization Intervals With Task Loss," in 2019 IEEE/CVF Conference on Computer Vision and Pattern Recognition (CVPR) (IEEE, 2019), pp. 4345-4354 2019.

I. Hubara, M. Courbariaux, D. Soudry, R. El-Yaniv, and Y. Bengio, "Quantized neural networks: Training neural networks with low precision weights and activations," J. Mach. Learn. Res. 18, 1-30 2018.

S. Zhou, Y. Wu, Z. Ni, X. Zhou, H. Wen, and Y. Zou, "DoReFa-Net: Training Low Bitwidth Convolutional Neural Networks with Low Bitwidth Gradients," 1, 1-13 2016.

U. Köster, T. J. Webb, X. Wang, M. Nassar, A. K. Bansal, W. H. Constable, O. H. Elibol, S. Gray, S. Hall, L. Hornof, A. Khosrowshahi, C. Kloss, R. J. Pai, and N. Rao, "Flexpoint: An adaptive numerical format for efficient training of deep neural networks," in Advances in Neural Information Processing Systems (2017), vol. 2017—Decem, pp. 1743-1753 2017.

M. Courbariaux, Y. Bengio, and J.-P. David, "Training deep neural networks with low precision multiplications," arXiv Prepr. arXiv1412. 7024 2014.

* cited by examiner

ADJUSTING PARAMETERS IN AN ADAPTIVE SYSTEM

BACKGROUND

The present application relates generally to control systems and more specifically to adaptive control systems with parameters including proportional-integral-derivative (PID) controllers and backpropagation (backward propagation of errors) for training artificial neural networks (ANN).

An adaptive system adjusts its system parameters to achieve target outputs from given inputs, which has a broad range of applications in control [1], and signal processing [2]. Due to the requirement or limitation of physical implementation, the system parameters often have limited ranges. In addition, to adjust the system parameters, intermediary parameters are usually required, which would also have limited ranges. During the adaptation process, the range limitations impose a constraint on system parameters and intermediary parameters, which may compromise the performance of the system.

Artificial neural networks (ANN) is a class of adaptive system that transform inputs such as text, audios, images, videos, to outputs of desired formats to achieve various tasks. ANNs are comprised of layers of interconnected neurons with nonlinear activation functions. The weights of the interconnection between neurons of adjacent layers are adjusted during the training process to minimize the discrepancy between the network outputs and targeted outputs. When imposing range limits on the weights, inputs and activations of hidden layers, and the gradients of these parameters, inferior results could be observed.

SUMMARY OF THE INVENTION

One embodiment of the present invention is an adaptive system with parameters and intermediary variables with adjustable ranges. The ranges are determined based on the statistics of the parameters/variables during the adaptation process to reduce errors caused by clipping and/or low precision, leading to improved performance in range-limited adaptive systems.

More specifically described is an adaptive system and a novel method for adjusting a parameter in the adaptive system. The adaptive system in one example is an adaptive control system or an adaptive proportional-integral-derivative controller, or an artificial neural network.

The method includes operating an adaptive system with an output signal produced from an input signal applied to an input, in which a parameter with a finite range is adjusted based on a difference between the output signal and a target output signal. In one example, the parameter with the finite range is a fixed-point parameter or an analog parameter. Typically the parameter is one of an analog electrical signal, a digital electrical signal, an analog optical signal, a digital optical signal or a digital-and-analog hybrid signal.

Next, the parameter is accessed from the adaptive system. A probability distribution of the parameter is assigned. The finite range for the parameter is updated based on the probability distribution which has been assigned. The probability distribution function may be updated alone with the finite range of the parameter. The probability distribution may be derived from historical values of the parameter, a plurality of system parameters belonging to an identical category of data as the parameter, or both.

The parameter with the finite range in one example includes an intermediary parameter(s) with the finite range. The finite range for the parameter is updated based on the probability distribution which has been assigned, this updating includes adjusting the intermediary parameter(s). Further, in some embodiments, the probability distribution is derived from a historical value of the intermediary parameter, a plurality of intermediary parameters belonging to an identical category of data as the intermediary parameter, or both.

In other embodiments, the finite range of the parameter may be set to an interval associated with a prescribed confidence level of the probability distribution. In some cases the probability distribution is derived from the parameter under a plurality of system input and output conditions.

BRIEF DESCRIPTION THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3($b$) is an ANN layer structure implemented using analog nonlinearity on fixed-point, low-precision computing units;

Figure 7A:
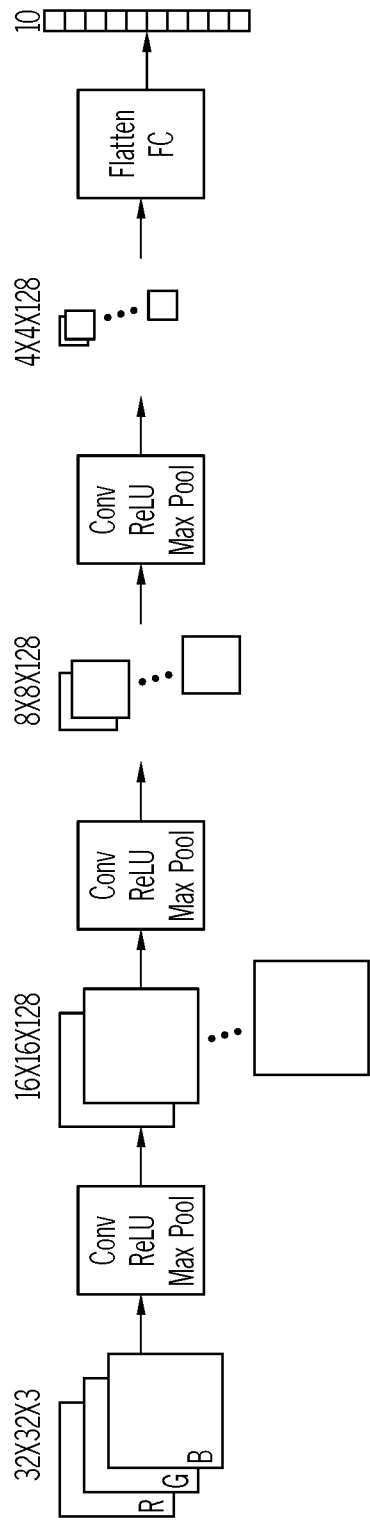
FIG. 7A illustrates a neural network structure for the classification of CIFAR-10 images.
Figure 7B:
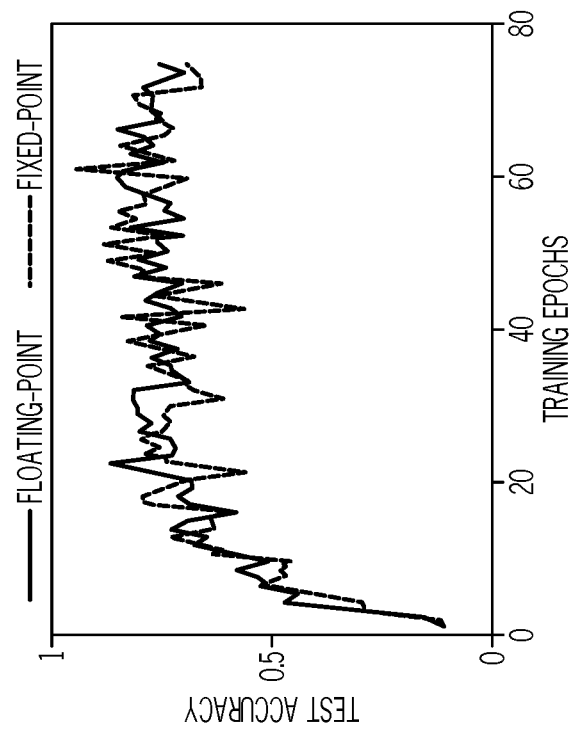
Figure 8A:
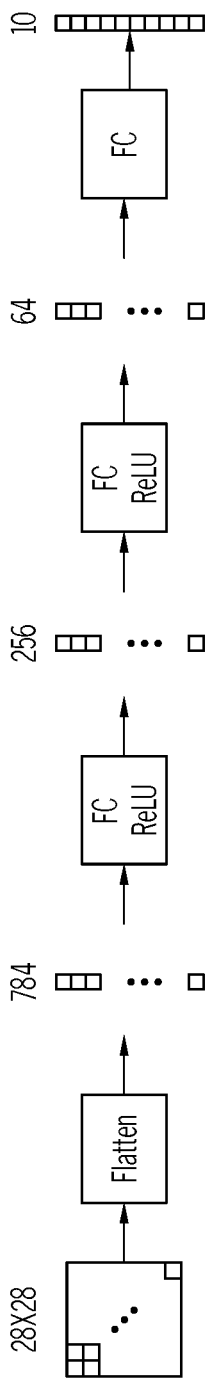
Figure 8B:
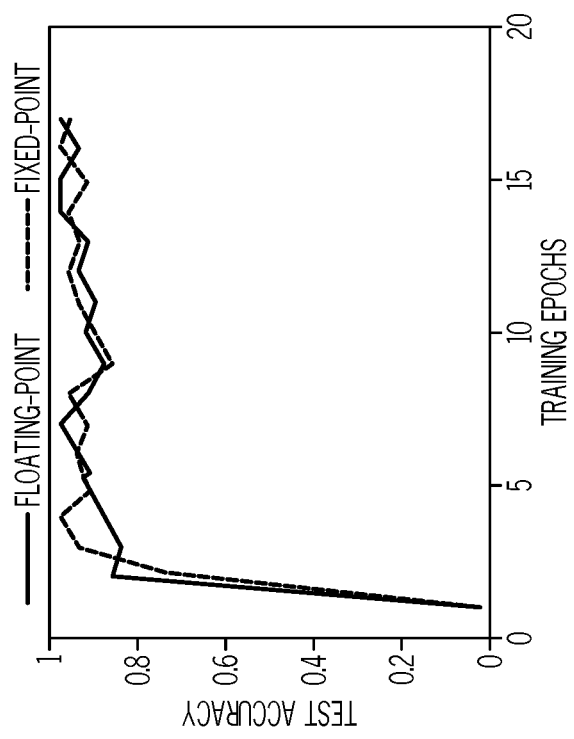
Figure 9:
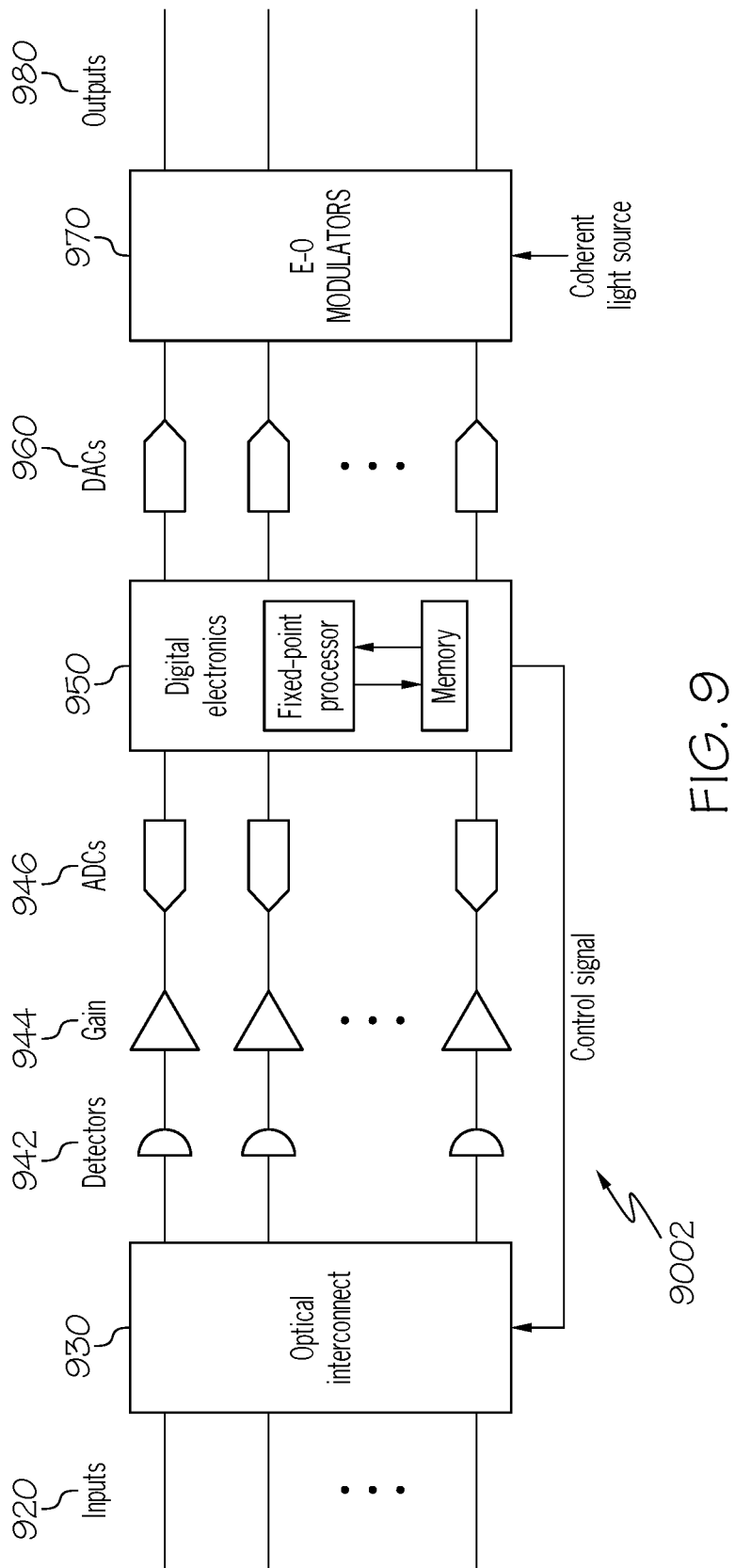
Figure 10:
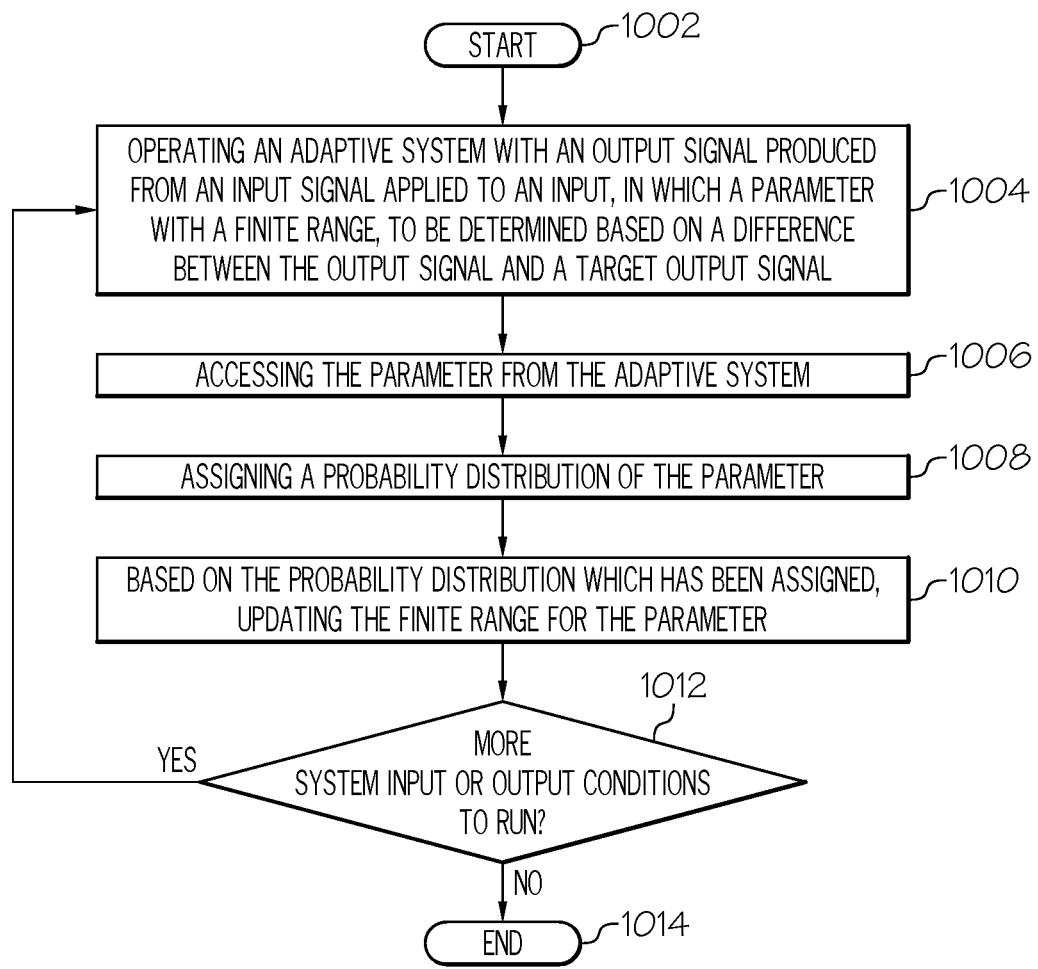

FIG. 7B plots an experimental test accuracy curve with respect to the number of training epochs for both fixed-point and floating-point networks;

FIG. 8A illustrates a neural network structure for the classification of MNIST hand-written digits;

FIG. 8B illustrates an experimental test of the accuracy as a function of training epochs for fixed-point and floating-point trained neural networks;

FIG. 9 is an example of hybrid analog optical and digital electronic system; and FIG. 10 is a flow chart for a method of adjusting parameters in an adaptive system.

DETAILED DESCRIPTION

Non-Limiting Definitions

The term "adaptive system" is an optical, electro-optical, electrical, biological, or processor based device with an output signal produced from an input signal applied to an input, in which a parameter based on or related to the output and a target output is feed back to the input.

The term "analog-and-digital hybrid signal" is a combination of digital and analog signals. It is used mostly in specialized applications where both kinds of data need to be processed.

The term "analog parameter" is any continuous time-varying signal, such as electric signal, electro-magnetic signal, wireless signal, optical signal, used to represent real data type.

The term "category of data" is data that shares a particular characteristic.

The term "finite range" is a range of values possible for a given variable or measurement of a numerical quantity. For example, an analog signal whose limited precision is 0.1V and the finite range is between 0-1V, the equivalent fixed-point precision is 10 level i.e. approximately 3 bits.

The term "fixed-point" is a real data type for a number that has a fixed number of digits after, and sometimes also before, the radix point or decimal point. Fixed-point number representation can be compared to the more complicated, and more computationally demanding floating-point number representation.

The term "intermediary parameter" is any signal based on or directly related to the output which may be combined with other intermediary parameters, whether or not in the same category of data, to create one or more feedback parameters.

The term "limited precision" is a range defining the measurement resolution of data. This is usually measured in bits, but sometimes in decimal digits. The limited precision is derived from a finite range in some cases.

The term "parameter" is any signal based on or directly related to the output which is directly or indirectly feed back to the input without the use of floating-point number representation. In an adaptive control system, the parameter is known as a controller parameter. In artificial intelligence, the parameter is the neural network parameter tuned during training.

The term "probability distribution" is a distribution of numerical data.

The term "real data type" is a data type used in a computer program to represent an approximation of a real number.

The term "statistical parameter" is a quantity entering into the probability distribution of a statistic or a random variable as part of the output for a given layer of an adaptive system.

The term "target output" is a true output of label on a given dataset in ANN during training or actual target on an adaptive control system. The main goal in parameter tuning is to minimize the error between the output (or actual output) and target output.

Adaptive Systems Overview

Figure 1:
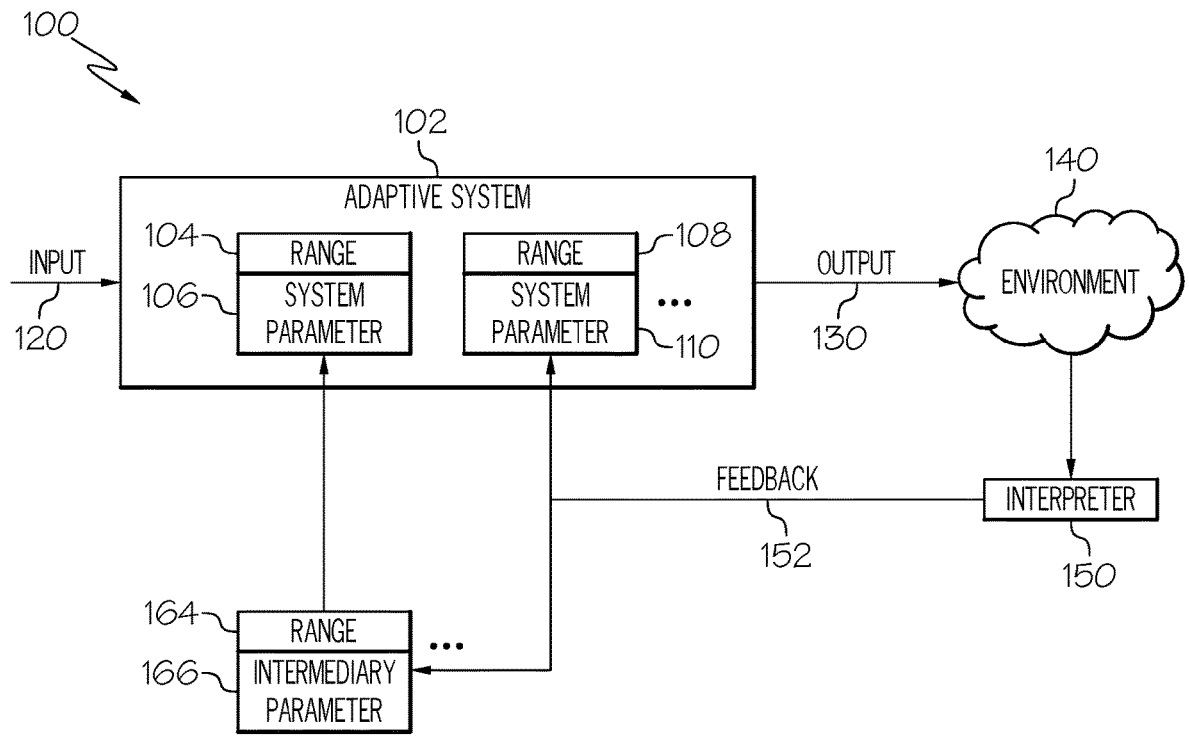
FIG. 1 is an adaptive system capable of producing output from the given input according to the forward operations defined by the structure of the system and associated system parameters.

Turning now to FIG. 1 illustrated is an adaptive system 102 capable of producing output 130 from the given input 120 according to the forward operations defined by the structure of the system and associated system parameters 106, 110. The forward operations can be controlled by one or more adjustable system parameters, each of which can be either intrinsic to the system or determined by one or more adjustable intermediary parameters 166. In some implementations, the intermediary parameters 166 can belong to part of the adaptive system 102. The output alters the environment surrounding the adaptive system 102.

Adaptation of system 102 is implemented via feedback(s) based on the interpretation 150 of the environment 140. The changes of the environment 140 can be detected by sensors (not shown) which send data to the interpreter 150. In some systems, the output 130 can be part of the environment 140, and involved in the interpretation process. The interpreter 150 translates the change in the environment into a feedback signal 152 that is sent back into the system. The feedback signal 152 or simply feedback can modify one or more system parameters directly or indirectly through the intermediary parameters 166. In some systems, the feedback can be an integrated part of the adaptive system, sharing some of its system and intermediary parameters 166, or reuse some of its forward operations.

As an example, the adaptive system 102 can be a real-time proportional-integral-derivative (PID) motion system. The PID motion system consists of a motor, a controller, and sensors. The controller performs the forward operation and interprets the environment. The input of the system is the target position. The forward operation outputs the real-time driving voltage applied to the motor, and thus changes its position. In the forward operation, the driving voltage is the summation of three system parameters, which are the proportional, integral, and derivative terms derived from the position error. The environment is made up of reading from position sensors.

In the adaptation process, sensors detect the current position of the motor and send it to the interpreter 150. The interpreter 150 performs a comparison between current and target position, and outputs the position error, which is then fed into the forward operation. The proportional, integral, and derivative terms are calculated and aggregated as the new output driving voltage. In some more sophisticated motion control system, additional sensors can be used to detect the velocity and acceleration of the motor. The interpreter 150 also compares the velocity and acceleration with pre-defined limits, and feeds the excessive amount disproportionally to the driving voltage of the motor to prevent unnecessary wear on the hardware. In this case, intermediary parameters 166 that store the excessive velocity and acceleration can be used.

As another example, the adaptive system 102 can be a reinforcement learning system trained to play a game. The input is the current state of the game, i.e. the board configuration, or the cards already played. The system parameters are the reward values grouped into the Q-table which tells a game-playing agent the reward it receives for various actions under different game states. In the forward operation, the agent selects an action with highest reward in its current Q-table under the current game state. The environment consists of possible outcomes of the game, each associated with a score defined by the game rules. After the agent performs the move, the game state is updated, and the environment is changed.

The adaptation process iteratively modifies the Q-table to inform the agent of better strategies in future game plays. An interpreter 150 calculates the reward by aggregating the scores associated with possible outcomes of the game under the updated game state. It then modifies the reward of the corresponding actions in the agent's Q-table. This iteration continues until system parameters in the Q-table converges. In some implementations, instead of surveying all possible game outcomes to calculate the reward, the reward is estimated based on one or more optimal outcomes and their probability. In this case intermediary parameters 166 are used to compute the probability of the optimal outcomes before the Q-table is updated.

Physical properties and limitations of the system dictate the finite ranges 104, 108, 164 and limited precision each system and the intermediary parameter(s) 166 can attain. For example, if the adaptive system 102 uses analog processing, the finite range is limited by the saturation level of the detectors, sensors and other analog modulation or processing units, and the precision is limited by the noise of the analog signal. If the adaptive system 102 uses digital processing, the finite range is determined by the number of bits above decimal point, and the precision is limited by the total bit width of the processor. The adaptive system 102 can also use a hybrid of analog and digital processing in different components. In all these scenarios, the precisions of system and intermediary parameters 166 are often pre-determined by the system property (e.g. number of bits or decimal digits) and cannot be changed during the adaptation process. To ensure the system can produce the target output with minimum error, system parameters, intermediary parameters 166, as well as their associated finite ranges, need to be optimized.

It is important to note, that unlike prior art adaptive systems which rely on floating-point numbers for all or a portion of their parameters, the individual parameters 106, 110, and intermediary parameter 166 have limited precisions and finite ranges. Stated differently in one embodiment, the individual parameters 106, 110, and intermediary parameter 166 are fixed-point data types and do not use floating-point numbers.

In the adaptive system 102 illustrated in FIG. 1, the finite ranges 104, 108, 164 of individual parameters 106, 110, 166 can be adjusted based on the statistics of the parameter values. For an individual parameter, the statistical distribution can be estimated from the historical values of the parameters during the adaptation process. For example, if the adaptive system 102 employs discrete, iterative feedback steps, such as those in a reinforcement learning system, the distribution can be fitted from the parameter values from the previous iterations. As another example, if the adaptive system 102 employs a continuous feedback, such as a real-time motion system, the distribution can be fitted from a portion of or the whole time series of the parameter in the past.

In some embodiment of the adaptive system 102, sharing the same finite range across multiple parameters is a more efficient way to implement the adaptive system 102. For example, the x, y, and z positions in a real-time PID motion system can be grouped together into a position vector, and the x, y, and z components share the same finite range. In this case, the distribution can be estimated from the current values of all the parameters grouped together. In general, individual or a set of system and intermediary parameters 166 can share the finite range in an adaptive system 102. The distribution can be fitted based on the statics of a hybrid of the historical and current values of individual or a set of parameters.

After the distribution of individual or a group of parameters is fitted, a confidence level can be assigned to estimate the potential maximum and minimum of the individual or a group of parameters. The potential maximum is set where the probably of observing the parameter value below the potential maximum equals the confidence level. The potential minimum is set where the probably of observing the parameter value above the potential minimum equals the confidence level. In some embodiments different confidence levels can be set for the potential maximum and potential minimum. The finite range of the individual or a group of parameters are adjusted to enclose the potential maximum and minimum. Such adjustment process can be performed on one or multiple input instances during the adaptation process.

Artificial Neural Network (ANN) Example

Figure 2:
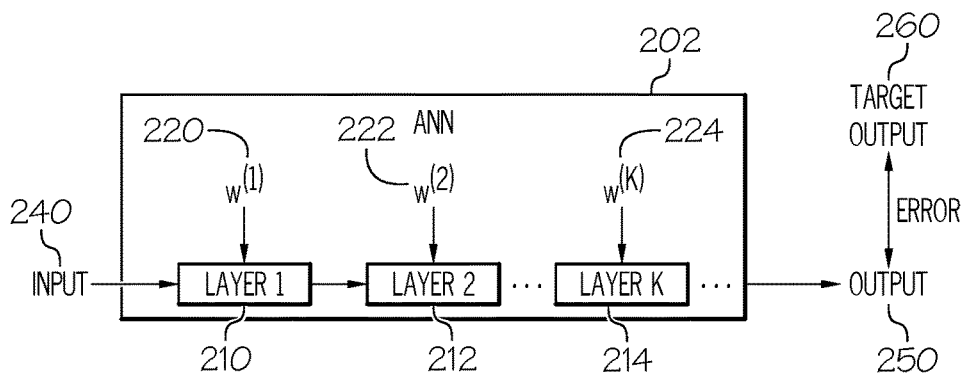
FIG. 2 is an illustration of an ANN as an example of adaptive system.

Turning now to FIG. 2, shown is an illustration of an artificial neural network (ANN) 202 as an example of adaptive system. The ANN 202 consists of cascade of K layers 210, 212, 214 as shown, in which K is a positive integer. The system parameters of the ANN are the weights 220, 222, 224 of each layer. The input 240 of ANN can be the image, text, audio, video, or any other data that need to be processed. In the forward operation, which is called "inference process" in ANN, each layer performs calculations, determined by the weights, on its input, and produces an output fed into the next layer 210, 212, 214. The output of the last layer 214 is the output 250 of the ANN system. The ANN output is compared with pre-defined target output, and the error of the output is interpreted as the feedback for the adaptation process.

Adaptation of the ANN 202 is the training process of the weights in each layer. In the training process, errors between inference outputs and target outputs are backpropagated (backward propagation of errors) through each layer to modify the weights, so that the ANN outputs match the target outputs. Details of this adaptation process is described in FIG. 5.

ANN systems have been demonstrated on digital, analog, or a hybrid of analog and digital computing platforms. With the growing complexity of the tasks, deeper ANNs are required, which demand an increasing computing power for the adaptation processes. Because ANN involves recurring multiplications and summations in all layers, the majority of the computing power is consumed by repetitive memory access and data movement [5]. Fixed-point computing units, requiring low memory footprints, can reduce the power consumption by 18 to 30 times compared to its floating-point counterparts [6]. On the device level, fixed-point ANN has demonstrated an at least 7 times reduction in power consumption compared to floating-point processing units such as CPU and GPU [10]. Analog computers have also been shown to improve power efficiency through parallelized in-memory computation, thus reducing memory access in ANN computations [11]. Compared to floating-point digital processors, two orders of magnitudes higher power efficiency can potentially be achieved by ANN implemented with memristor arrays [12], and an even higher efficiency has been projected with integrated photonics processors [13]. There has been a growing interest in implementing ANN on fixed-point, low-precision computing units, yet these systems suffer from reduced inference accuracy.

ANN typically handles high-dimensional data; hence the number of connections is usually very large, requiring a large number of weights to representing the interconnection between the inputs of two sequential layers. These weights are usually grouped into a high-dimensional tensor. The range is shared among the elements in a tensor for efficient computation on fixed-point, low-precision units. To facilitate the adaptation process, a series of intermediary parameters, also represented as tensors, are involved in each layer. These include the activations and inputs of intermediate layers, and gradients of the error with respect to the weights and these intermediary parameters.

Figure 3A:
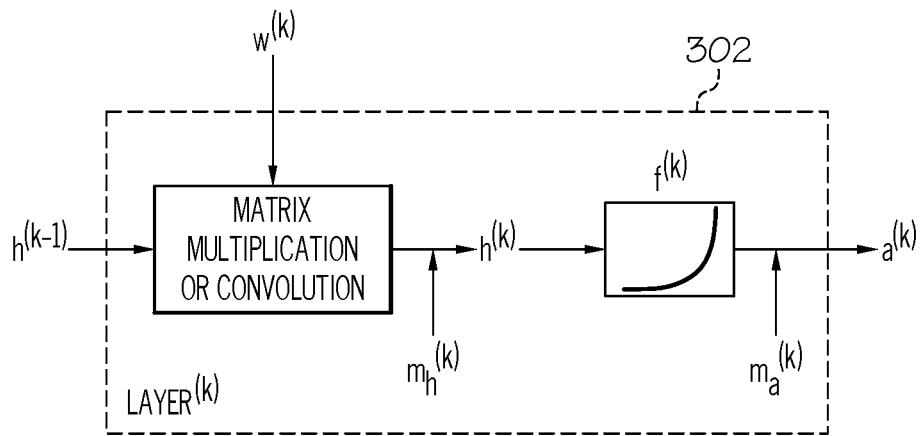
FIG. 3($a$) is an ANN layer structure implemented digitally on fixed-point, low-precision computing units.

FIG. 3(a) is an ANN layer structure 302 implemented on fixed-point, low-precision computing units. The inputs $a^{(k-1)}$ and weights $W^{(k)}$ are fed into a multiplication-and-accumulation (MAC) calculation to obtain a set of activations, $h^{(k)}$. The MAC calculation, which can be matrix multiplication, convolution or any other operations that accumulates a series of partial sums from weighted inputs, is performed on analog or fixed-point computation platforms. The MAC calculation results are digitized to a fixed-point tensor $h^{(k)}$ via the conversion function q $$h^{(k)} = q_L(W^{(k)} \cdot a^{(k-1)}; m_h^{(k)}). \tag{1}$$

Here L is the bit width of the converted tensor; $M_h^{(k)}$ controls the range of the tensor. The implementation of L and $m_h^{(k)}$ within the conversion function is detailed in FIG.

4, "·" denotes the MAC operation. The activation function $f^{(k)}$ maps $h^{(k)}$ to the input $a^{(k)}$ of the (k+1)-th layer in fixed-point format, via another set of conversion parameters L and $m_a^{(k)}$ $$a^{(k)} = q_L(f^{(k)}(h^{(k)}); m_a^{(k)}). \quad (2)$$

For the first layer, $a^{(0)}$ is the data input x converted into the fixed-point format via q. For the last layer, the activation $h^{(N)}$ is fed into a loss function $l(h^{(N)})$ to evaluate the inference performance.

Figure 3B:
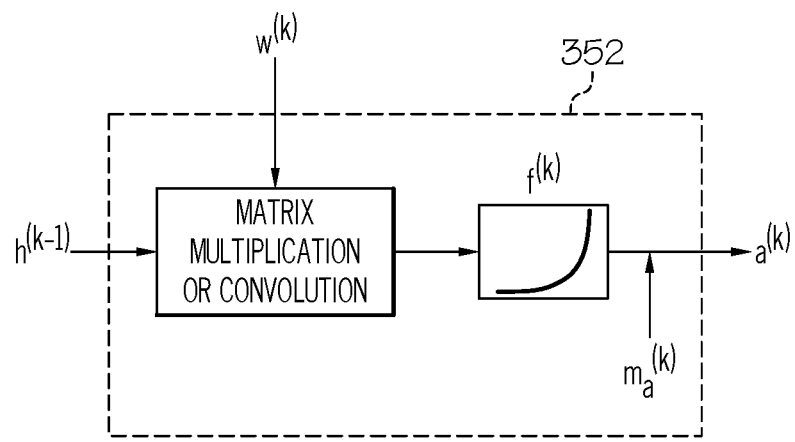

The activation function $f^{(k)}$ can be implemented digitally, for example, as a look-up table that maps two fixed-point numbers. In some implementations $f^{(k)}$ can be an analog function based on the intrinsic non-linear property associated with the analog computational platform, as shown in FIG. 3(b). For example, optical nonlinearity can be used as the activation function in photonics analog computing platforms. As another example, nonlinear electronic components such as diodes, transistors can be used as activation function in electronic analog computing platforms. In the case of an analog activation function, $a^{(k)}$ is given by $$a^{(k)} = q_L(f^{(k)}(W^{(k)} \cdot a^{(k-1)}); m_a^{(k)}). \quad (3)$$

Figure 4:
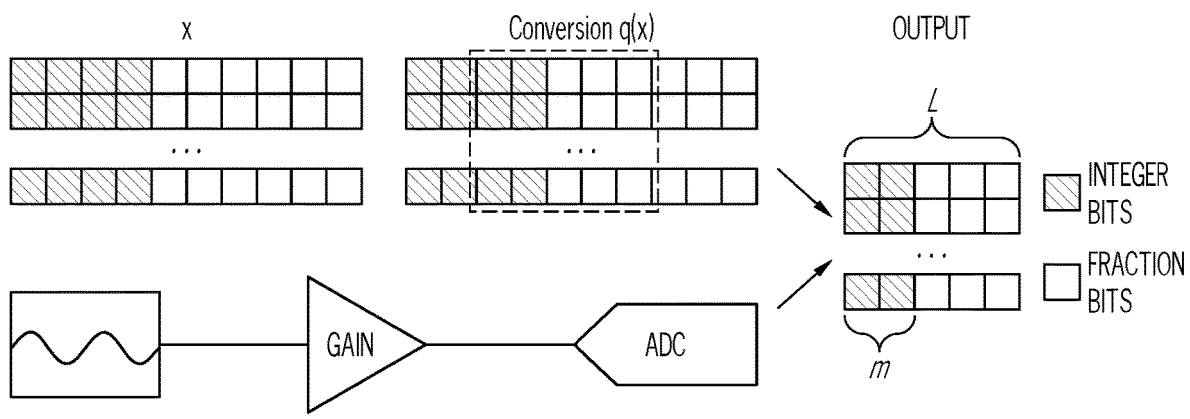
FIG. 4 illustrates the principle of the conversion function q mentioned in FIG. 3.

Turning now to FIG. 4, shown is the principle of the conversion function q mentioned in FIG. 3. Given an input tensor X, each element x within the tensor X is converted to a signed fixed-point format $$q_L(x; m) = \begin{cases} \left[\dfrac{x}{2^{L-m-1}}\right], & |x| < (2^m - 2^{m+1-L}) \\ \text{sign}(x)(2^m - 2^{m+1-L}), & |x| \geq (2^{aT} - 2^{m+1-L}) \end{cases} \quad (4)$$

Here L is the total number of bits to represent each fixed-point tensor. It can be the same or different for all tensors in a neural network. m is a range parameter that represents the number of integer bits, and is shared among all elements in the tensor X. [·] represents the rounding operation to the adjacent integers, which can be either nearest or stochastic.

The conversion function q can be implemented either digitally or in analog. In the digital implementation of q, the input X into the conversion function q is a fixed-point tensor in a different precision format. The conversion function trims all tensor elements to L bits, staring at m-th bit above the decimal point. If the precision format of X contains fewer than L bits, leading or trailing 0s can be padded to either or both ends. In some implementations where a range smaller than 1 is needed, m can be a negative number, representing the (m−1)-th bit below the decimal point. In the analog implementation of q, the input X is a real-values tensor representing the analog signal. The conversion function consists of gain and analog-to-digit (ADC) conversion circuitry. L can be implemented as the number of digitization bits of the ADC. m can be implemented by adjusting the analog gain or loss on the signal.

Prior Limited-Range ANN Training

The current deployment of ANN on fixed-point, low-precision computing units can be roughly divided into the following three categories:

1. Deploy a pre-trained model onto fixed-point or analog computation units for inference, by adapting weights and activations to the hardware's quantization limit. The training is performed using floating-point. Subsequent tuning algorithms adjust the fixed-point neural network parameters to compensate the inference accuracy loss [12,14]. The trained neural network parameters (floating or high precision fixed-point) are deployed in fixed-point inference.

2. Inference is deployed by fixed-point units, but training is partially performed by fixed-point units: In the inference processes of adaptation, low bit width quantization functions have been applied to the neural network variables including weights, inputs, activations and outputs in all layers. The inference processes can be carried out in fixed-point units. The quantization functions essentially adjust the range of the variables to extend the dynamic range of the fixed-point numbers. This range adjustment can also be implicitly implemented in form of trainable scaling and clipping parameters [14,15]. However, in backpropagation processes, either the gradients are calculated by floating-point units [12,13], or intermediate results in floating-point format are required to determine the range adjustment [19,20].

3. Training is completely carried out by fixed-point units. Typical backpropagation training has been applied using fixed-point units or analog processors; however, the range of all variables in inference and training processes are pre-determined [7,18].

There are two major limitations in the prior works. The first limitation is that the gradients decrease during the training, so their range parameters must be updated as the training progresses, to prevent degradation in training performance if they are represented by the fixed number of digitization levels. The second limitation is that there is no way to determine the range parameters based on quantized tensor representations, with potentially overflown and truncated elements.

Disclosed Limited-Range Training of ANN

Figure 5:
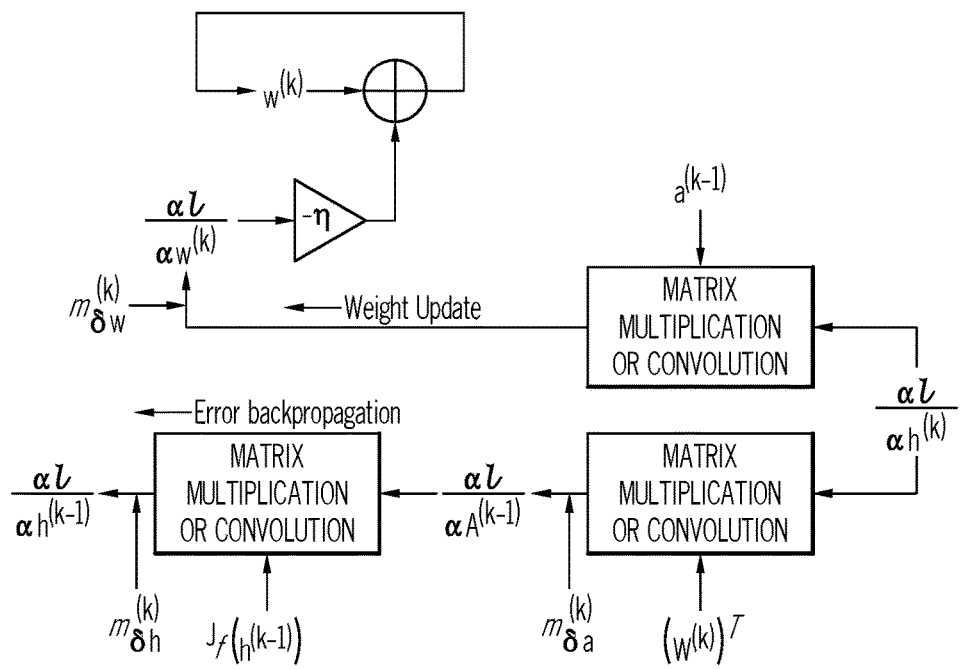
FIG. 5 illustrates training of fixed-point ANN.

FIG. 5 illustrates training of fixed-point ANN. The goal of training is to determine the optimal fixed-point weights and range parameters for each layer. FIG. 5 illustrates the calculations in layer k during the training process of the fixed-point neural network. One iteration of the training consists of the weight training step and range update step. In the weight training step, the gradients of the loss function with respect to all the weights are obtained using analog or fixed-point MAC calculations. the gradient flow through the k-th layer in the weight training phase, which consists of two branches, weight update and error backpropagation. In the weight update branch, the fixed-point gradient with respect to the weight is calculated from the error $$\frac{\partial l}{\partial h^{(k)}},$$

with range parameter $m_{\delta W}^{(k)}$ $$\frac{\partial l}{\partial W^{(k)}} = q_L\left(\frac{\partial l}{\partial h^{(k)}} \cdot a^{(k-1)}, m_{\delta W}^{(k)}\right). \quad (5)$$

The weight tensor is updated by the amount $\eta \partial l / \partial W^{(k)}$ rounded to the same fixed-point format as $W^{(k)}$, where $\eta$ is the learning rate. If the weight update is performed in analog, $\eta$ can be the gain or loss on the analog signal $\partial l / \partial W^{(k)}$. The error backpropagation branch consists of two MAC calculations. First, the fixed-point gradient $\partial l / \partial a^{(k-1)}$ with respect to the layer input $a^{(k-1)}$ is calculated, with range parameter $m_{\partial a}^{(k-1)}$ $$\frac{\partial l}{\partial a^{(k-1)}} = q_L\left(\frac{\partial l}{\partial h^{(k)}} \cdot W^{(k)}, m_{\delta a}^{(k-1)}\right). \quad (6)$$

Next, the gradients of the loss function $\partial l/\partial h^{(k-i)}$ with respect to the activations in the previous layer $h^{(k-1)}$, is calculated with a range parameter $m_{\delta h}^{(k)}$, $$\frac{\partial l}{\partial h^{(k)}} = q_L\left(\frac{\partial l}{\partial a^{(k)}} \cdot J_f, m_{\delta h}^{(k)}\right). \quad (7)$$

Here $J_f = [\partial a_i/\partial h_j]_{ij}$ is the Jacobian of the activation $f^{(k)}$. If $f^{(k)}$ acts elementwise on $h^{(k)}$, the Jacobian is a diagonal matrix $J_f = \text{diag}[f^{(k)\prime}(h_i^{(k)})]_i$, in which $f^{(k)\prime}$ can be represented by another look-up table that maps two fixed point values.

The ANN example contains a total of five (5) range parameters, $m_h^{(k)}$, $m_a^{(k)}$, $m_{\delta h}^{(k)}$, $m_{\delta a}^{(k)}$, $m_{\delta W}^{(k)}$, in each layer. The five (5) range parameters can be adjusted simultaneously following one or multiple training iterations, or at different moments during the training process whenever deemed necessary. The range update can last throughout the entire training process or terminate after a specific number of training iterations.

Figure 6:
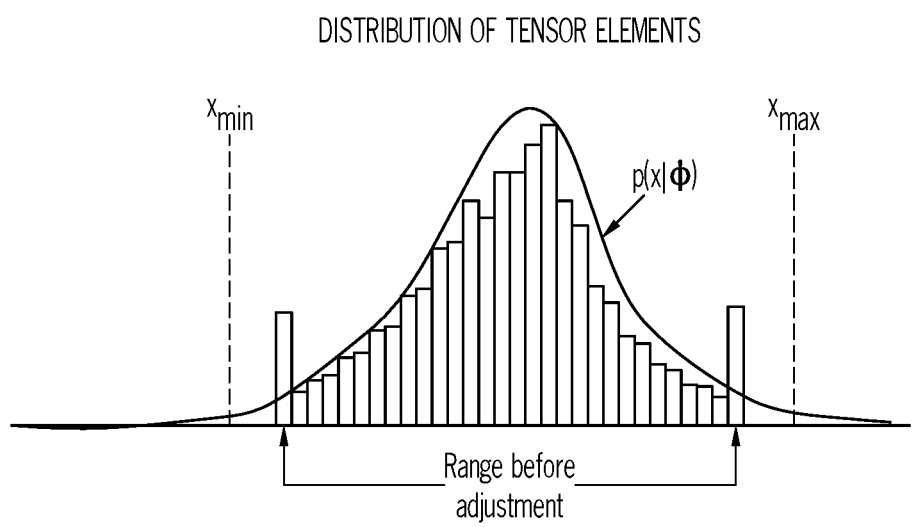
FIG. 6 illustrates how the range of an ANN tensor is adjusted based on the statistics of its elements.

FIG. 6 illustrates how the range of an ANN tensor is adjusted based on the statistics of its elements. The histogram plots the distribution of tensor elements before the range adjustment. The distribution can be surveyed from the values of tensor elements at the current training iteration. Alternatively, the distribution can be aggregated from the values in previous one or more training iterations. If the range before adjustment is too small, overflow elements occur at one or both ends of the distribution before range adjustment. If the range before adjustment is too large, the distribution before range adjustment clusters towards its center. Based on the distribution of tensor elements before the adjustment, new range is calculated from the following steps:

1. Select a probability density function, p (x|ϕ), with parameters ϕ to model the distribution of the element x in X.
2. Optimize ϕ to fit the statistics of tensor elements $x_i$ before the range adjustment. As an example, the optimal parameter ϕ can be determined by maximizing the likelihood of observing all non-clipped tensor elements given ϕ. The distribution parameter ϕ can also be determined from the statistical history of the tensor during the training phase.
3. Calculate the cumulative distribution function $$F(x) = \int_{-\infty}^{x} p(\hat{x}|\phi)d\hat{x} \quad (8)$$

4. Estimate the upper and lower boundary of x, $x_{max}$, $x_{min}$, based on two confidence levels $c_1$, $c_2$, ($0<c_1<1$, $0<c_2<1$) on the cumulative distribution function, such that ratio of tensor elements fall above $x_{max}$, and $c_2$ ratio of tensor elements fall below $x_{min}$. The upper and lower boundaries are given by $$x_{max} = F^{-1}(1-c_1),$$

$$x_{min} = F^{-1}(c_2), \quad (9)$$

where $F^{-1}$ is the inverse function of F. In some cases, $c_1$ and $c_2$ can also be chosen with the same value.

5. Update the range parameter $m_x = \lceil \log_2 \max\{|x_{max}|, |x_{min}|\} + 1 \rceil$, where $\lceil \alpha \rceil$ denotes the smallest integer larger than α.

Turning now to FIG. 7A, shown is a neural network structure for the classification of CIFAR-10 images.

As an example of ANN, a convolutional neural network can be constructed and trained to classify CIFAR-10 images using the fixed-point inference, training and range adjustment scheme in this invention. FIG. 7A details the structure and performance of the fixed-point neural network. The input of the network is a 32×32×3 tensor representing the RGB channels of a 32×32 color image from the CIFAR-10 dataset. The first convolutional layer convolves (Conv) the input image with 128 5×5 kernels and applies rectified linear unit (ReLU) activation. The convolution result undergoes 2×2 maximum pooling (Max Pool) and is reduced to 16×16× 128 as the input to the second layer. The second and third convolutional layers uses different sets of 128 5×5 kernels with ReLU activation and 2×2 maximum pooling. In the fourth layer, the output of the third convolution layer is flattened and fully connected (FC) to a vector via a 2048×10 weight matrix. The activation function of layer 4 is softmax, which converts the 10-element matrix multiplication output to the probabilities of the ten (10) classes given the input color image. The loss function is the cross-entropy between the predicted and true probability of each class. For performance comparison, a floating-point neural network is constructed based on the same structure of the fixed-point network. The five (5) training instances using random weight initializations are performed for both networks.

In the example illustrated in FIG. 7A, all tensors are represented in 10-bit fixed-point format. The distribution of elements in each tensor is modeled by an individual Gaussian probability density function with its own mean, μ, and variance, σ, parameters. The distribution parameters μ, σ, are estimated from maximum likelihood using all elements within the tensor as observations. $x_{max}$, and $x_{min}$ are computed from the cumulative distribution function with $c_1 = c_2 = 0.03\%$ for all tensors. This gives an upper and low boundary of $x_{max} = \mu + 3\sigma$, $x_{min} = \mu - 3\sigma$, respectively. Range updates are performed every 10 weight training steps and lasted for a total of 5000 steps.

FIG. 7B plots the test accuracy curve with respect to the number of training epochs for both fixed-point and floating-point networks. Among all 5 training instances, the fixed-point training achieves a classification accuracy of 76.4±0.01%, which is comparable to that of the floating-point network 76.74±0.005%.

FIG. 8A illustrates a neural network structure for the classification of MNIST hand-written digits. FIG. 8B illustrates a test of the accuracy as a function of training epochs for fixed-point and floating-point trained neural networks.

In another example of ANN, a fully connected neural network can be constructed and trained to classify MNIST hand-written digits using the fixed-point inference, training and range adjustment scheme disclosed in this invention. FIG. 8A details the structure and performance of the fixed-point neural network. The input of the network is a 28×28 tensor representing a black-and-white image of the MNIST hand-written digit. In the first fully connected layer, the input image is flattened into a 784-element vector, fully connected (FC) to 256 activations via a 256×784 weight matrix, and fed into rectified linear unit (ReLU). The second fully connected layers outputs 64 elements via a 64×256 weight matrix, followed by ReLU activation. The third layer outputs 10 units via a 10×64 weight matrix. The activations of the third layer are fed into softmax function that outputs the probabilities of being each of the 10 digits (digit 0 to 9) given the input image. The loss function is the cross-entropy between the predicted and true probability of each digit. There are five (5) fixed-point training instances with random initializations are performed, and compared to the network with the same structure using floating-point training.

In the example illustrated in FIG. 8A, all tensors are represented in 8-bit fixed-point format. The weight training phase is performed on Edge TPU (Coral Inc.), which is an 8-bit fixed-point tensor computation unit. The range adjustment follows the same process as the CIFAR-10 example in FIG. 7A. Calculation of Eq. (9) is performed on Intel i7-7700K CPU. FIG. 8B plots the test accuracy curve with respect to the number of training epochs for both fixed-point and floating-point networks. The fixed-point training achieves a classification accuracy of 96.0±0.01%, which is comparable to that of the floating-point training 96.1±0.01%.

FIG. 9 is an example of hybrid analog optical and digital electronic system 902. The hybrid optical-electrical network layer maps a set of input analog optical signals 920 to a set of output optical signals 980 via optical interconnections 930 with digital electronics 950 for storage 952 and fixed-point computation 954. The inputs 920 are coherently mixed through optical interconnections 930, which can be implemented with free-space diffractive optics or integrated photonics circuits, etc. The weights of the coherent mixing can be part of the input optical signals 920, or as modulations on the inputs based on the control signal. The coherently mixed optical signals are collected by the optical detectors 940, producing analog electrical signals that are amplified 944 and converted to digital signals via analog-to-digital conversion (ADC) circuitries 946. The ADC outputs are processed with digital electronics 950, which include a fixed-point processor 954 interfacing with memory units 952 to store the weights of each layers and/or intermediate parameters. The fixed-point processor 954 performs error compensation, nonlinear mapping, or a combination of such digital signal processing (DSP) tasks. It can also generate the control signal for the other components. The processed digital signals are converted to analog optical signals via digital-to-analog conversion (DAC) circuitries 960 and a set of electro-optic (E-O) modulators 970 to modulate a coherent light source.

Example High Level Flow

FIG. 10 is a flow chart for a method of adjusting parameters in an adaptive system. The method starts in step 1002 and immediately proceeds to step 1004.

In step 1004, the method starts with operating an adaptive system. The adaptive system in one example is an adaptive control system or an adaptive proportional-integral-derivative controller, or an artificial neural network, such as those described in FIG. 1 thru FIG. 5. The adaptive system includes an output signal produced from an input signal applied to an input, in which a parameter with a finite range is determined based on a difference between the output signal and a target output signal. In one example the parameter with the finite range is a fixed-point parameter or an analog parameter. Typically the parameter is one of an analog electrical signal, a digital electrical signal, an analog optical signal, a digital optical signal or a digital-and-analog hybrid signal. The process continues to step 1006.

In step 1006, the parameter is accessed from the adaptive system. The process continues to step 1008.

In step 1008, a probability distribution of the parameter is assigned, such as those described in FIG. 6. The process continues to step 1010.

In step 1010, the finite range for the parameter is updated based on the probability distribution which has been assigned. The probability distribution function may be updated alone with the finite range of the parameter. The probability distribution may be derived from historical values of the parameter, a plurality of system parameters belonging to an identical category of data as the parameter, or both.

The parameter with the limited precision in one example includes an intermediary parameter(s) with the finite range. The finite range for the parameter is updated based on the probability distribution which has been assigned, this updating includes adjusting the intermediary parameter(s). Further, in some embodiments, the probability distribution is derived from a historical value of the intermediary parameter, a plurality of intermediary parameters belonging to an identical category of data as the intermediary parameter, or both.

In other embodiments, the finite range of the parameter may be set to a confidence interval associated with a prescribed confidence level of the probability distribution. In some cases the probability distribution is derived from the parameter under a plurality of system input and output conditions.

The process continues to step 1012. In step 1012, a test is made if there are more adaptive system input conditions or output conditions or samples to run. If there are more samples to run the process continues back to step 1004. Otherwise, the process ends in step 1014.

Non-Limiting Examples

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, although not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, although do not preclude the presence or addition of one or more other features, integers, steps, operations, elements, components, and/or groups thereof.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand various embodiments of the present invention, with various modifications as are suited to the particular use contemplated.

INCORPORATED REFERENCES

The following publications listed in the Information Disclosure Statement submitted herewith are each incorporated by reference in their entirety:
1. S. Sastry, M. Bodson, and J. F. Bartram, "Adaptive Control: Stability, Convergence, and Robustness," J. Acoust. Soc. Am. 88, 588-589 (1990).
2. S. O. Haykin, Adaptive Filter Theory, 5th ed. (Pearson Education, 2013).
3. T. F. de Lima, H.-T. Peng, A. N. Tait, M. A. Nahmias, H. B. Miller, B. J. Shastri, and P. R. Prucnal, "Machine Learning With Neuromorphic Photonics," J. Light. Technol. 37, 1515-1534 (2019).
4. A. Krizhevsky, I. Sutskever, and G. E. Hinton, "ImageNet classification with deep convolutional neural networks," in Advances in Neural Information Processing Systems (2012).
5. A. Esteva, B. Kuprel, R. A. Novoa, J. Ko, S. M. Swetter, H. M. Blau, and S. Thrun, "Dermatologist-level classification of skin cancer with deep neural networks," Nature 542, 115-118 (2017).
6. R. Collobert and J. Weston, "A Unified Architecture for Natural Language Processing: Deep Neural Networks with Multitask Learning," in Proceedings of the 25th International Conference on Machine Learning, ICML '08 (Association for Computing Machinery, 2008), pp. 160-167.
7. D. Silver, T. Hubert, J. Schrittwieser, I. Antonoglou, T. Graepel, T. Lillicrap, K. Simonyan, D. Hassabis, A. Turing, and C. Shannon, "A general reinforcement learning algorithm that masters chess, shogi, and Go through self-play," Science (80-.). 1144, 1140-1144 (2018).
8. V. Sze, Y. Chen, T. Yang, and J. S. Emer, "Efficient Processing of Deep Neural Networks: A Tutorial and Survey," Proc. IEEE 105, 2295-2329 (2017).
9. M. Horowitz, "Computing's energy problem (and what we can do about it)," in 2014 IEEE International Solid-State Circuits Conference Digest of Technical Papers (ISSCC) (IEEE, 2014), pp. 10-14.
10. S. Gupta, A. Agrawal, K. Gopalakrishnan, and P. Narayanan, "Deep Learning with Limited Numerical Precision," 32nd Int. Conf. Mach. Learn. ICML 2015 3, 1737-1746 (2015).
11. W. Haensch, T. Gokmen, and R. Puri, "The Next Generation of Deep Learning Hardware: Analog Computing," Proc. IEEE 107, 108-122 (2019).
12. P. Yao, H. Wu, B. Gao, J. Tang, Q. Zhang, W. Zhang, J. J. Yang, and H. Qian, "Fully hardware-implemented memristor convolutional neural network," Nature 577, 641-646 (2020).
13. R. Hamerly, L. Bernstein, A. Sludds, M. Soljačić, and D. Englund, "Large-Scale Optical Neural Networks Based on Photoelectric Multiplication," Phys. Rev. X 9, 1-12 (2019).
14. M. Cheng, L. Xia, Z. Zhu, Y. Cai, Y. Xie, Y. Wang, and H. Yang, "TIME: A training-in-memory architecture for RRAM-based deep neural networks," IEEE Trans. Comput. Des. Integr. Circuits Syst. 38, 834-847 (2019).
15. J. Choi, Z. Wang, S. Venkataramani, P. I.-J. Chuang, V. Srinivasan, and K. Gopalakrishnan, "PACT: Parameterized Clipping Activation for Quantized Neural Networks," arXiv Prepr. arXiv1805.06085 1-15 (2018).
16. S. Jung, C. Son, S. Lee, J. Son, J.-J. Han, Y. Kwak, S. J. Hwang, and C. Choi, "Learning to Quantize Deep Networks by Optimizing Quantization Intervals With Task Loss," in 2019 IEEE/CVF Conference on Computer Vision and Pattern Recognition (CVPR) (IEEE, 2019), pp. 4345-4354.
17. I. Hubara, M. Courbariaux, D. Soudry, R. El-Yaniv, and Y. Bengio, "Quantized neural networks: Training neural networks with low precision weights and activations," J. Mach. Learn. Res. 18, 1-30 (2018).
18. S. Zhou, Y. Wu, Z. Ni, X. Zhou, H. Wen, and Y. Zou, "DoReFa-Net: Training Low Bitwidth Convolutional Neural Networks with Low Bitwidth Gradients," 1, 1-13 (2016).
19. U. Köster, T. J. Webb, X. Wang, M. Nassar, A. K. Bansal, W. H. Constable, 0. H. Elibol, S. Gray, S. Hall, L. Hornof, A. Khosrowshahi, C. Kloss, R. J. Pai, and N. Rao, "Flexpoint: An adaptive numerical format for efficient training of deep neural networks," in Advances in Neural Information Processing Systems (2017), Vol. 2017-Decem, pp. 1743-1753.
20. M. Courbariaux, Y. Bengio, and J.-P. David, "Training deep neural networks with low precision multiplications," arXiv Prepr. arXiv1412.7024 (2014).

What is claimed is:

1. A method for adjusting a parameter in an adaptive system comprising:
    operating an adaptive system with an output signal with a fixed output range produced from an input signal with a fixed input range applied to an input, in which a parameter with an adjustable range with fixed precision is based on a difference between the output signal and a target output signal, and the parameter is a fixed-point digital format or an analog format;
    accessing the parameter from the adaptive system;
    dynamically assigning a probability distribution of the parameter; and
    based on the probability distribution which has been assigned, dynamically updating the adjustable range for the parameter.

2. The method of claim 1 in which a statistical parameter of the probability distribution is updated as part of updating the adjustable range for the parameter.

3. The method of claim 1 in which the probability distribution is derived from one or more historical values of the parameter, a plurality of system parameters belonging to an identical category of data as the parameter, or both.

4. The method of claim 1 in which the adjustable range of the parameter is set to an interval associated with a prescribed confidence level of the probability distribution.

5. The method of claim 1 in which the probability distribution is derived from the parameter under a plurality of system input and output conditions.

6. The method of claim 1 in which the parameter is one of an analog electrical signal, a digital electrical signal, an analog optical signal, a digital optical signal or a digital-and-analog hybrid signal.

7. The method of claim 1 wherein the adaptive system is one of an adaptive control system, an adaptive proportional-integral-derivative controller, or an artificial neural network.

8. The method of claim 1 in which the parameter with the adjustable range includes at least one intermediary parameter with the adjustable range, and the adjusting of the parameter with the adjustable range based on the probability distribution includes adjusting the at least one intermediary parameter with the adjustable range based on the probability distribution of the intermediary parameter.

9. The method of claim 8 in which the probability distribution is derived from a historical value of the intermediary parameter, a plurality of intermediary parameters belonging to an identical category of data as the intermediary parameter, or both.

10. The method of claim 8 in which the adjustable range of the at least one intermediary parameter is set to an interval associated with a prescribed confidence level of the probability distribution.

11. The method of claim 8 in which the probability distribution is derived from at least one intermediary parameter under a plurality of system input and output conditions.

12. The method of claim 8 in which the at least one intermediary parameter is an analog electrical signal, a digital electrical signal, an analog optical signal, a digital optical signal or a digital-and-analog hybrid signal.

13. The method of claim 1, further comprising:
based on the probability distribution is outside the adjustable range, updating the adjustable range based on estimating a lower bound and an upper bound of the probability distribution until the probability distribution is within range and then based on the probability distribution is within the adjustable range, updating the adjustable range for the parameter.

14. An adaptive system comprising:
at least one input for receiving an input signal;
at least one output for producing an output signal with a fixed output range based on the input signal with a fixed input range applied to the input, in which a parameter with an adjustable range but fixed precision is based on a difference between the output signal and a target output signal, and the parameter is a fixed-point format or an analog format;
an interpreter for accessing the parameter from the adaptive system; and
a fixed-point processor for assigning a probability distribution of the parameter and based on the probability distribution which has been assigned, the fixed-point processor dynamically updating the adjustable range for the parameter.

15. The adaptive system of claim 14 wherein the adaptive system is one of an adaptive control system, an adaptive proportional-integral-derivative controller, or an artificial neural network.

16. The adaptive system of claim 14 in which the parameter with the adjustable range is fixed-point parameter or an analog parameter.

17. The adaptive system of claim 14 in which a statistical parameter of the probability distribution is updated as part of updating the adjustable range for the parameter.

18. The adaptive system of claim 14 in which the probability distribution is derived from one or more historical values of the parameter, a plurality of system parameters belonging to an identical category of data as the parameter, or both.

19. The adaptive system of claim 14 in which the adjustable range of the parameter is set to a confidence interval associated with a prescribed confidence level of the probability distribution.

20. The adaptive system of claim 14 in which the parameter with the adjustable range includes at least one intermediary parameter with the adjustable range, and the updating the adjustable range of the parameter based on the probability distribution includes adjusting the at least one intermediary parameter with the adjustable range based on the probability distribution of the intermediary parameter.

21. The method of claim 1 in which a statistical parameter of the probability distribution is updated as part of updating the adjustable range for the parameter and the adjustable-range of the parameter is set to an interval associated with a prescribed confidence level of the probability distribution.

22. A method for dynamically adjusting a range of a parameter, analog or digital, in an adaptive system comprising:
operating an adaptive system with an output signal with a fixed output range produced from an input signal with a fixed input range applied to an input, in which a range of a parameter is adjusted by
accessing the parameter during system adaptation;
dynamically assigning a probability distribution of the parameter; and
based on the probability distribution, which has been dynamically assigned,
dynamically updating the range for the parameter.

23. The method of claim 22, wherein
in response to the parameter being analog, the parameter is discretized to a fixed number of levels, while the range of the parameter is dynamically adjusted; or
in response to the parameter being digital, the parameter is represented by a fixed number of levels, while the range of the parameter is dynamically adjusted.

* * * * *